United States Patent [19]

Hino

[11] Patent Number: 4,849,831
[45] Date of Patent: Jul. 18, 1989

[54] VIDEO TAPE EDITING APPARATUS FOR INSERTING VIDEO SIGNALS WHILE RETAINING PRERECORDED AUDIO SIGNALS

[76] Inventor: Hiromasa Hino, No. 798 Miyanodai, Kaisei-machi, Ashigarakami-gun, Kanagawa, Japan

[21] Appl. No.: 212,073

[22] Filed: Jun. 27, 1988

Related U.S. Application Data

[63] Continuation of Ser. No. 651,810, Sep. 18, 1984, abandoned.

[30] Foreign Application Priority Data

Sep. 26, 1983 [JP] Japan ................. 58-176427

[51] Int. Cl.⁴ ............. H04N 5/782; G11B 27/02
[52] U.S. Cl. ................... 360/14.1; 360/19.1; 369/83; 358/311; 358/343
[58] Field of Search ........ 360/14.1, 19.1, 77, 360/23; 358/310, 311, 335, 343, 341; 369/4, 83

[56] References Cited

U.S. PATENT DOCUMENTS

| 3,257,504 | 6/1966 | Boundsll | 360/14.1 |
| 3,934,263 | 1/1976 | Palmer | 358/343 X |
| 4,389,680 | 6/1983 | Gramling | 360/14.1 |
| 4,453,809 | 6/1984 | Hill et al. | 369/83 X |
| 4,467,370 | 8/1984 | Hoshino et al. | 360/14.1 X |
| 4,492,986 | 1/1985 | Kono et al. | 360/19.1 X |
| 4,520,405 | 5/1985 | Sasaki et al. | 360/14.1 X |
| 4,536,805 | 8/1985 | Maeda | 360/14.1 |
| 4,558,382 | 12/1985 | Edakubo et al. | 360/77 |
| 4,571,641 | 2/1986 | Fujiki et al. | 360/19.1 |

Primary Examiner—Robert L. Richardson
Assistant Examiner—W. R. Young
Attorney, Agent, or Firm—Birch, Stewart, Kolasch & Birch

[57] ABSTRACT

A video tape editing apparatus for performing an insertion editing operation in a system in which audio signals are recorded together with video signals on a video track in accordance with a helical scanning system, the video tape recorder editing apparatus including: a rotating head assembly for rotating at a predetermined speed; a first head carried on the rotating head assembly for recording signals on the track; a second head carried on the head assembly at a position upstream relative to the first head along the rotating direction of the head assembly; a recording circuit for supplying video signals to the first head; and an audio circuit for reading audio signals from the track through the second head and for supplying the readout signals together with video signals from the recording circuit to the first head.

6 Claims, 4 Drawing Sheets

VIDEO TAPE EDITING APPARATUS FOR INSERTING VIDEO SIGNALS WHILE RETAINING PRERECORDED AUDIO SIGNALS

This application is a continuation of application Ser. No. 651,810, filed 9/18/84, now abandoned.

BACKGROUND OF THE INVENTION

1. Field of the Invention

The present invention relates to a video tape editing apparatus, and in particular, to a video tape editing apparatus which performs a signal insertion editing operation on a video tape on which audio signals are recorded on the same track(s) together with video signals in accordance with a helical scanning system.

2. Description of the Prior Art

For the insertion editing operation for recording new video signals, with audio signals if necessary, on a portion of video tape on which signals have already been recorded, it is necessary to record new video signals with proper matching established with respect to the track(s), on which video signals are already recorded, in order to not disturb the synchronization for regenerating the video signals.

In a video tape recorder adopting a conventional system in which audio signals are recorded on a track different from a video track, a full-erase head need not be utilized for the insertion of new video signals and consequently, only video signals previously recorded on the video track can be replaced with, or overwritten by, new video signals by a video head while retaining the audio signals recorded on the audio track.

However, in a system in which audio and video tracking signals are recorded on a video track, for example, by superimposing these signals with video signals, the audio signals previously recorded on the track will be erased if the new video signals are recorded on the track.

For a motion picture playback operation, it may be often required to insert necessary related images, such as an explanation about an image and a title thereof, into a recorded scene. Since such related images are closely associated with the environment of the recorded scene, a sudden interruption of the voice and sound due to the insertion, which have been continuously reproduced while playing back the recorded signals, would be disconcerting to the viewer. Even if another audio sound is inserted after the interruption of the audio signals due to the insert operation, an unnatural impression cannot be suppressed. Therefore, if other audio sound should be inserted, it is required for the insertion to retain the voice and sound previously recorded as much as possible, for example, by mixing it with the signals of other audio sound to be inserted with the previously recorded audio signals.

SUMMARY OF THE INVENTION

It is therefore an object of the present invention to provide a video tape editing apparatus in which audio signals are recorded together with video signals on a video track in a helical scanning system, and which is capable of inserting video signals while retaining the recorded audio signals.

In accordance with the present invention, a video tape editing apparatus in which audio signals are recorded together with video signals on a video track in a helical scanning system includes: a rotating head assembly turning at a predetermined speed, first head means carried on the rotating head assembly for recording signals on a track, second head means carried on the head assembly at a position upstream relative to the first head means in a rotating direction of the head assembly, recording circuit means for supplying video signals to the first head means, and audio circuit means for reading audio signals from the track via the second head means to supply the readout audio signals, together with the video signals from the recording circuit means, to the first head.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

The present invention will be described in detail by referring to the accompanying drawings.

Figure 1:
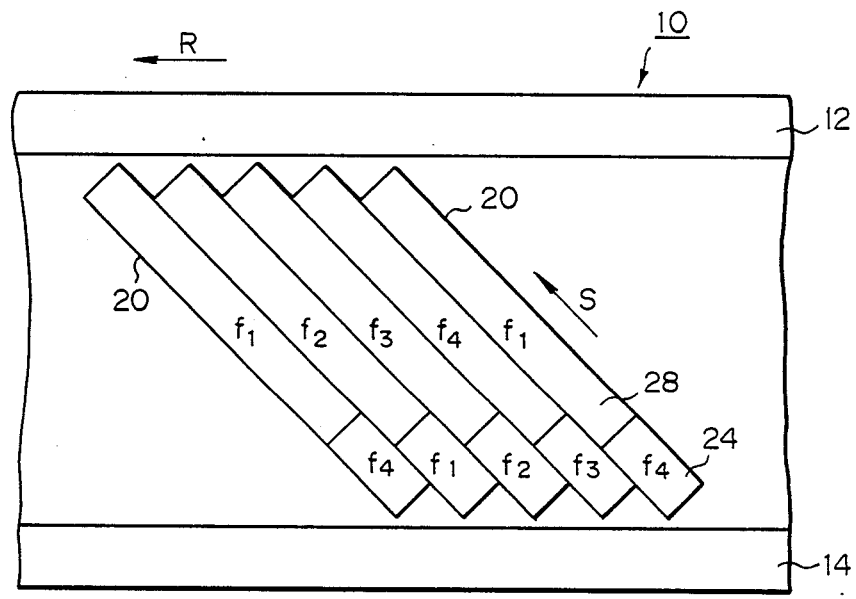
FIG. 1 is a schematic diagram illustrating an example of the recording format of a video tape on which signals are recorded with a video tape recorder according to the helical scanning system.

FIG. 1 illustrates an example of a recording format of video tape on which tracking control signals are superimposed and recorded together with the video and audio signals on the video track in accordance with the helical scanning system. In this example, a cue track 12 and an auxiliary audio track 14 are recorded on the respective edge portions of a video tape 10 running in the direction marked with an arrow R. Tracks 20 are recorded by the helical scanning operation in the area between tracks 12 and 14. The track 20 is referred to as "a helical track" for the purpose of explanation.

Figure 2:
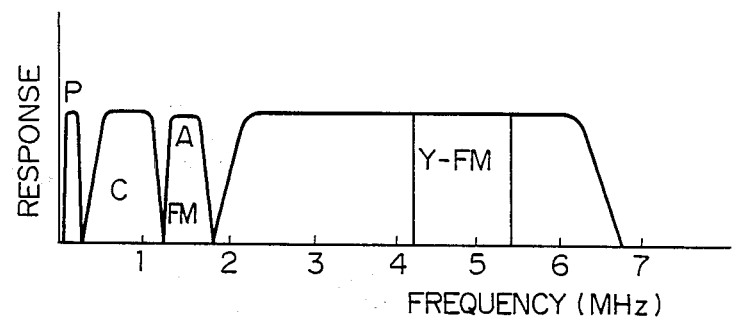
FIG. 2 is a graph depicting an example of the frequency spectra of the signals recorded on the video tape format of FIG. 1.

Mainly, the video and audio signals are recorded in the video area 28 in accordance with the frequency modulation recording system. The pulse code modulation (PCM) area 24 is an optional area on which audio signals are primarily recorded in the PCM recording system. The signals for tracking control, that is, pilot (P) signals are recorded in the areas 24 and 28. FIG. 2 illustrates an example of the frequency spectra of the recorded signals.

The pilot signals include four frequencies f1, f2, f3, and f4, for instance, which differ in frequency approximately 16 kHz between f2 and f1 and between f3 and f4 each, and approximately 46 kHz between f3 and f2 and between f4 and f1 each. The tracking servo operation is implemented by detecting the discrepancy between the pilot frequencies of the adjacent tracks as described above. Such a tracking control based on the four-frequency pilot signals is referred to as an automatic track following (ATF) system.

In the insert editing operation on the other hand, the signals recorded in the video area 28 including the pilot signals are entirely replaced with, or overwritten by, new signals. Consequently, if the tracking servo operation is not conducted in a certain manner, the new signals cannot be properly overwritten on the original track 20.

Furthermore, the audio signals are recorded in the video area 28 in accordance with the FM system. In addition, they may be recorded on the auxiliary track 14. However, since the audio signals recorded with the video signals in the video area 28 have undergone frequency modulation to be mixed with the video signals, an insertion editing operation for changing the video signals would erase these audio signals completely.

Figure 3:
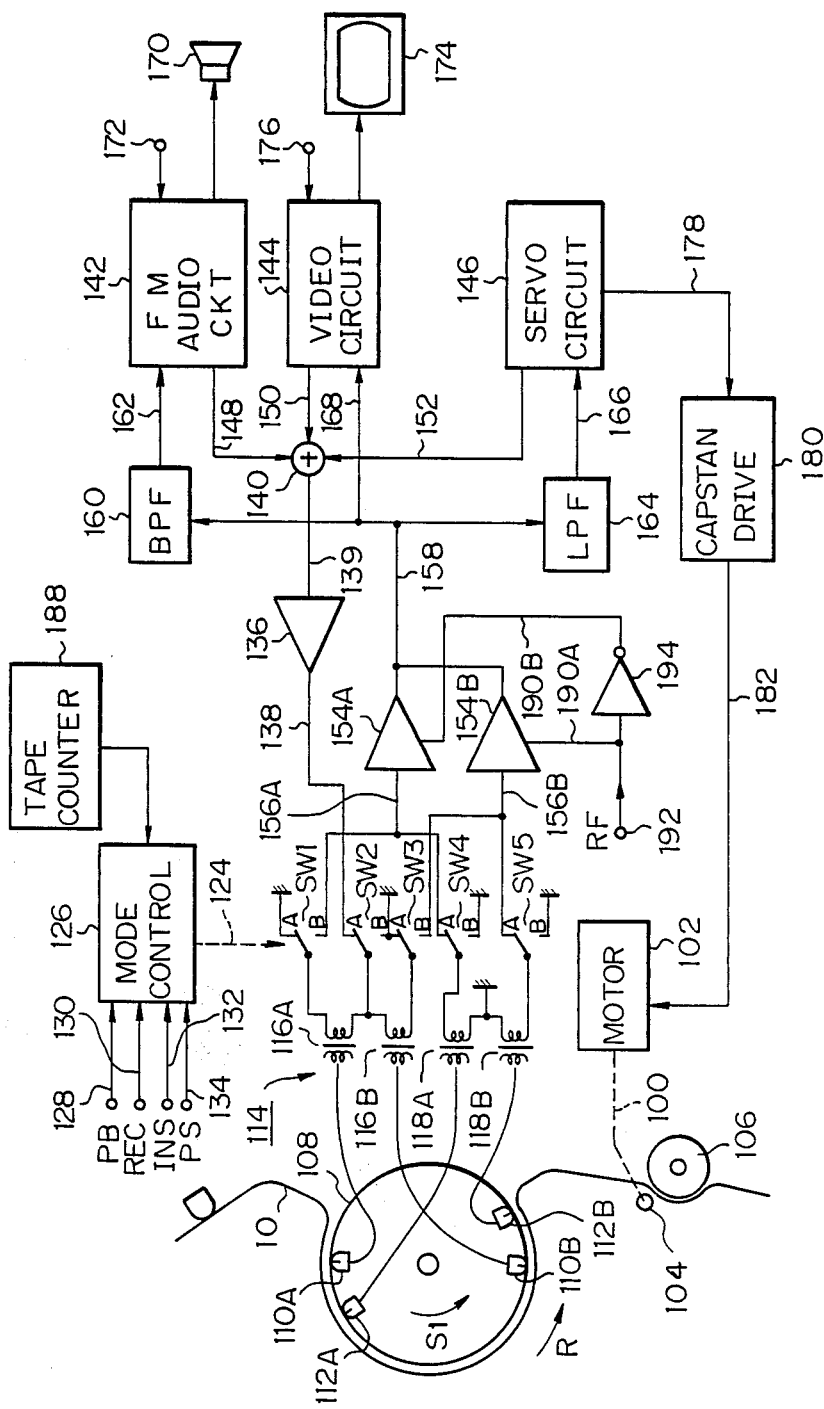
FIG. 3 is a schematic block diagram showing an embodiment of a video tape editing apparatus in accordance with the present invention.

FIG. 3 illustrates an embodiment of a video tape editing apparatus which solves the problem described above in accordance with the present invention. As conceptually indicated by chained line 100, a video tape 10, which is fed in the direction marked with an arrow R by a capstan 104 driven with a capstan motor 102 and a pinch roller 106, runs radially on a portion of the surface of a rotating head drum 108 which rotates in a direction marked with an arrow S1 at a constant speed. The winding angle for winding a portion of the tape 10 on the cylindrical surface of the drum 108 is at least approximately 221 degrees in the afore-stated instance. It is to be noted that, in this diagram, the elements which are not directly related to the understanding of the present invention are not shown for the simplicity of the figure.

As illustrated here, four magnetic heads, or transducers, 110A, 110B, 112A, and 112B are mounted on the rotating head drum 108. The magnetic heads 110A and 110B are wide-band magnetic heads arranged so as to obtain a phase shift of substantially 180 degrees therebetween for mainly recording video signals and the like in the video area 28 and for playing back such recorded signals.

The magnetic heads 112A and 112B are magnetic playback heads which are used also to read the pilot signals f1 to f4 in this embodiment. The magnetic heads 112A and 112B are also disposed with a phase shift of 180 degrees therebetween at positions upstream relative to the magnetic heads 110A and 110B, respectively, along the rotating direction of the drum 108. If the distances between the preceding magnetic heads 110A and 110B and the succeeding magnetic heads 112A and 112B, respectively, can be made shorter, the system becomes more advantageous because the offset values thereof relative to the magnetic heads 110A and 110B, respectively, are minimized.

Although these magnetic heads 110A, 110B, 112A, and 112B may have substantially the same characteristic, it will be satisfactory if the magnetic heads 112A and 112B are configured to be sensitive to the low-frequency audio signals in a relatively narrow band. In the latter configuration, the width of head gap need not be formed to be so small for the magnetic heads 112A and 112B as compared with that required for the video heads; for example, approximately 1 $\mu$m gap width will suffice under the circumstances in which the center carrier frequency of audio signals is 1.5 MHz and the tape speed relative to the heads is about 3.8 m/s. Consequently the heads can be constructed in a simple configuration, and the price thereof will be lowered. Since the video luminance signal is not included in the ATF signal reproduction and audio FM system, as described later, the disturbance to the signal recording system can be thus minimized.

The magnetic heads 110A, 110B, 112A, and 112B are connected to the windings 116A, 116B, 118A, and 118B of the rotary transformer 114, respectively. The output ports, i.e. the secondary ports of windings 116A and 116B are connected to changeover contact(s) SW1 to SW5. Although these changeover contacts SW1 to SW5 are illustrated in the form of mechanical contacts, they will be advantageously implemented by use of electronic switches. In addition, the windings 116A, 116B, 118A, and 118B of the rotary transformer 114 are ordinarily disposed in the vicinity of each other in the head drum assembly. As described above, however, if the magnetic heads 112A and 112B are so designed as to be different in characteristics from the magnetic heads 110A and 110B, the former do not pick up the video luminance signal; thus the disturbance to the video signal can be minimized even if there exists magnetic coupling among the transformer windings 116A, 116B, 118A, and 118B due to their adjacent disposition.

The changeover contacts SW1 to SW5 are controlled by a mode control circuit 126 as conceptually depicted by chained line 124. The mode control circuit 126 is provided to control the operation modes of this apparatus, in particular, the connection states of the contacts SW1 to SW5 by use of control signals supplied to the control inputs 128, 130, 132, and 134. In accordance with this embodiment, these control signals include the playback (PB), record (REC), insertion (INS), and pause (PS) signals. Furthermore, the tape count signal is provided from the tape counter 188 for measuring the length of a portion of the video tape 10 which has been fed. Among the control lines drawn from the mode control circuit 126 for controlling the respective sections of this apparatus, those lines which are not directly connected to the understanding of the present invention are not shown for the simplicity of the figure.

The changeover contact SW2 has a terminal A connected to an output 138 of the recording amplifier 136, which has an input 139 connected to an output of a signal composing circuit 140. Signal composing circuit 140 has three input ports interconnected respectively to outputs 148, 150, and 152 of an FM audio circuit 142, video circuit 144, and servo circuit 146, respectively. Since the changeover contact SW2 is connected to two windings 116A and 116B, the output signal of the recording amplifier 136 is supplied in parallel to both the magnetic heads 110A and 110B.

Both of the terminals B and A of the changeover contacts SW1 and SW4, respectively, are connected in common to the input 156A of a playback amplifier 154A, which has an output 158 connected to an input 162 of the FM audio circuit 142 via a band pass filter (BPF) 160 on one hand, and to an input 166 of the servo circuit 146 through the low-pass filter (LPF) 164, on the other hand. Similarly, the terminals B and A and the changeover contacts SW3 and SW5 are both connected to the input 156B of another playback amplifier 154B, which has an output connected in common with the output 158 of the playback amplifier 154A.

RF switching pulses are alternately supplied to the enable inputs 190A and 190B of the playback amplifiers 154A and 154B, respectively, and the circuitry is configured so that only the signals in the video region 28 are produced from the regenerative amplifiers 154A and 154B.

The mode control circuit 126 controls the changeover contacts SW1 to SW5 as follows: It sets all the changeover contacts SW1 to SW5 to the terminals B in the ordinary playback mode, sets all the changeover contacts SW1 to SW5 to the terminals A in the insertion mode, and sets the changeover contacts SW1 to SW3 to the terminals A and the changeover contacts SW4 and SW5 to the terminals B in the ordinary record mode.

The FM audio circuit 142 is used to demodulate the audio signal supplied from the input 162 to output the demodulated signal as an audible sound to an audio monitor 170, to transfer the audio signal from the input 162 directly via the output 148 to the signal composing circuit 140, or to modulate the audio signal from the external input 172 in accordance with the FM method to develop a resultant signal to the output 148. The details about these operations will be described later.

The video circuit 144 is provided to output the video signal from the input 168 which is subsequently visualized on a video monitor 174, to transfer the video signal from the input 168 directly via the output 150 to the signal composing circuit 140, or to output the video signal for an insertion editing operation from external input 176 to the output 150.

The servo circuit 146 is a control circuit primarily for conducting the tracking servo control on the ATF operation. The servo circuit 146 has a control output 178 connected to a drive circuit 180, which has an output 182 connected to the capstan motor 102.

In the ATF control section of the servo circuit 146, the pilot signals available from the adjacent tracks are detected as crosstalk components. The differences in frequency between the crosstalk components and the signals obtained from the main track are set to 16 kHz and 46 kHz, which are checked in amplitude level to carry out the tracking control, thereby conducting the ATF control.

Figure 4:
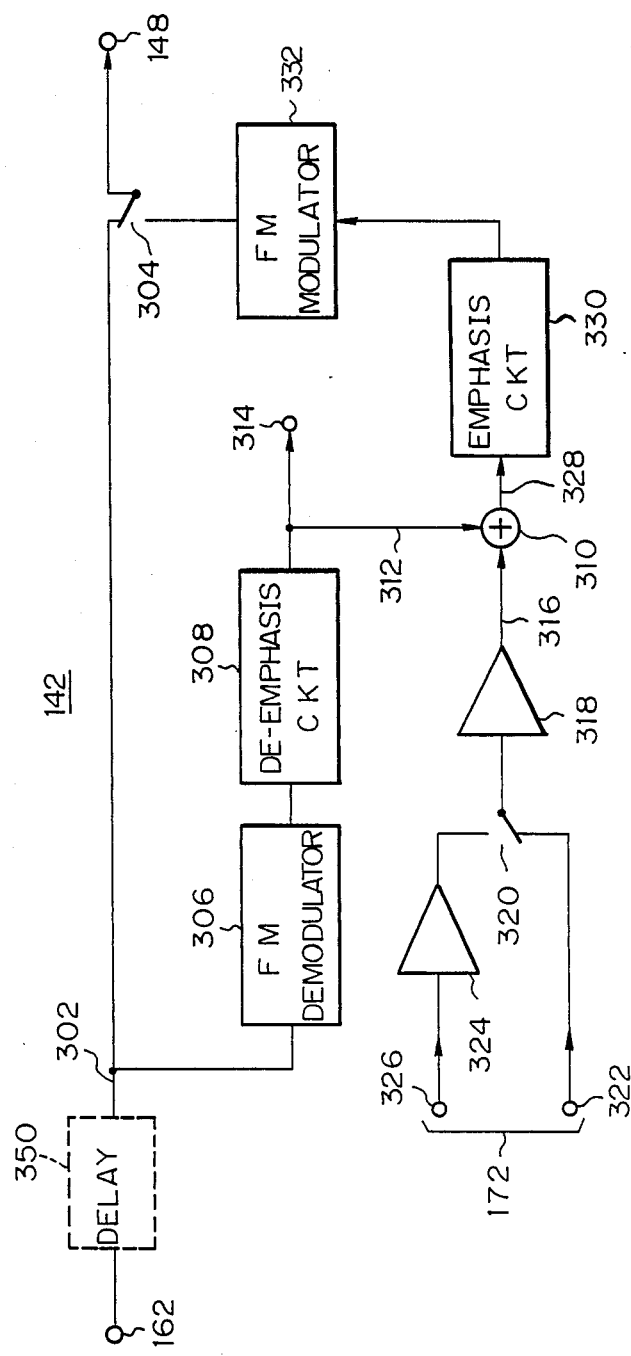
FIG. 4 is a block diagram of a frequency modulation (FM) audio circuit of FIG. 3.

Referring to FIG. 4, the FM audio circuit 142 receives the output 162 from the BPF 160 to be connected via a branch point 302 through a changeover contact 304 to an input 148 of the signal composing circuit 140. In the embodiment of FIG. 4 therefore, the branch point 302 is also connected to an FM demodulator 306, which supplies a signal to one input 312 of the mixer 310 through the de-emphasis circuit 308. The output 312 of the de-emphasis circuit 308 is also supplied to a connecting terminal 314 for the audio monitor 170.

The mixer 310 has another input 316 connected to a changeover contact 320 via an amplifier 318. The contact 320 has one port connected to an auxiliary input terminal 322, and the other port connected to a microphone input 326 via the amplifier 324. These provisions allow a microphone or other instrument to input the voice and sound to the FM audio circuit 142.

The mixer 310 has an output 328 connected to the contact 304 via an emphasis circuit 330 and an FM modulator 332.

The FM audio circuit 142 of FIG. 4 receives the audio signal from the output 162 of the BPF 160 which is read from the video area 28 on the track 20 by use of one of the magnetic heads 112A and 112B. Actually, the audio signal thus received is ahead in time by a time period associated with the distances between the magnetic heads 112A, 112B and the magnetic heads 110A, 110B. This audio signal is used to compose a signal together with other signals, such as the video signal from the video circuit 144 and the pilot signal from the servo circuit 146 in the signal composing circuit 140. Then the resultant signal is recorded in the video area 28 by the magnetic head 110A or 110B. That is, the audio signals read from the audio area 28 by use of the magnetic heads 112A and 112B are not recorded at the same position in the same area.

In practice however, the interval between the preceding and succeeding magnetic heads should be advantageously set to be sufficiently short relative to the period of the pilot signal in consideration to the servo system, so it is allowed in designing the assembly to dispose these magnetic heads with the distance to dispose these magnetic heads with the distance therebetween correspondent to 0.25 H at the minimum in the magnetic head configuration, where H is a time period for scanning a horizontal line of a picture. For example, the distance corresponding to the time discrepancy of 0.5 H is equivalent to 32 microseconds in the standard television system. The time discrepancy of such a magnitude will rarely be perceived by the human eye. Consequently, the difference between the front and subsequent heads may be ignored for the audio system.

If the time discrepancy described above cannot be ignored because of a longer distance disposed between these magnetic heads, an appropriate delay circuit 350 for supplying a delay time equivalent to the time discrepancy need only be added between the input end 162 and the branch point 302 as depicted by the dotted line in FIG. 4.

In a case as described above in which external audio signals are mixed into those to be re-recorded again in the video area 28, it is only necessary to input the signals from a microphone or other external audio signals to the external input terminal 172. The external audio signals are mixed with the audio signals read by the magnetic head 112A or 112B by use of the mixer 310, the components in the higher frequency range are emphasized by the emphasis circuit 330, and the obtained signals undergo frequency modulation in the FM modulator 332. If the contact 304 is connected to the FM modulator 332 in advance for this operation, the resultant signals will be delivered to the output 148.

Figure 5:
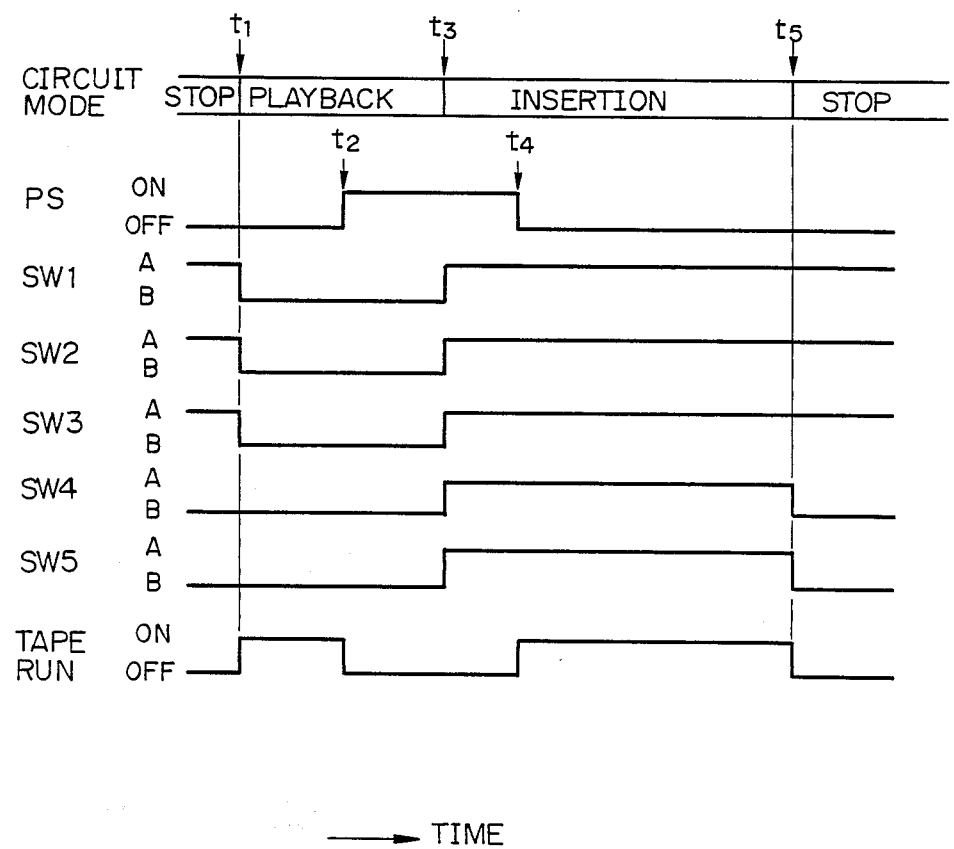
FIG. 5 is a timing chart depicting the insertion editing operation in the embodiment of FIG. 3.

The operations of this apparatus will be generally described by referring to the timing chart of FIG. 5. In the insertion editing operation for recording other video signals in a portion of a video tape on which signals have already been recorded, the tape counter 188 is set to 0 at the end of that portion of the video tape 10 into which the insertion is to be made. Then, the apparatus is set to the rewind mode in order that the video tape is rewound up to a point preceding that insertion portion.

When the PLAYBACK button, not shown, is actuated at the time t1, FIG. 5, the switches SW1 to SW5 are connected to the terminals B, respectively.

In the playback mode, the signals read from each helical track 20 by the video heads 110A and 110B are supplied to the FM audio circuit 142, video circuit 144, and servo circuit 146 through the playback amplifiers 154A and 154B. In this state, the servo circuit 146 performs the ATF control by using the pilot frequencies f1 to f4.

While checking the images on the video monitor 174, the operator presses the PAUSE button, for example, at the beginning of the insertion portion at the time t2, so that the mode control circuit 126 temporarily stops the running of tape 10 with the pause (PS) signal.

If the INSERT button, not shown, is then operated at the time t3, the mode control circuit 126 is set to the insertion mode in response to the insertion (INS) signal. The video system is in turn changed from the playback (PB) mode to the record (REC) mode, and thus the servo system is retained in the PB mode. The mode control circuit 126 controls all switches S1 to SW5 to set them to the terminal A. Then, the signals from the magnetic heads 112A and 112B are supplied to the playback amplifiers 154A and 154B, while the signal from the recording amplifier 136 is delivered to the magnetic heads 110A and 110B.

When the pause mode is released by actuating the PAUSE button at the time t4, the mode control circuit 126 restarts the tape from the temporary halt state, to perform the insertion operation. At the same time, the video signals to be inserted are fed to the video input terminal 176, and the audio signals to be inserted are delivered to the audio input terminal 172 if required. When it is desired to retain the audio signals as they are recorded on the video tape 10, the audio signals read from the video tape 10 by the magnetic heads 112A and 112B may be supplied to the recording amplifier 136 via the FM audio circuit 142. Then, the audio signals are re-recorded by use of the audio circuit 142.

During the insert operation, one of the magnetic heads 112A and 112B, the head 112A, for example, scans a helical track 20, and thereafter one of the magnetic heads 110A and 110B, that is, the magnetic head 110A in this example, scans the same helical track 20. At a time when the head drum 108 has rotated approximately 180 degrees in the direction indicated by the arrow S1 after one pair of magnetic heads 112A and 110A, for example, start scanning a track, the other pair of magnetic heads 112B and 110B initiate scanning the next track. Since each track is drawn along the scanning direction S by approximately 220 degrees of rotational angle of drum 108 as described above, two pairs of magnetic heads 112A, 110A and 112B, 110B scan simultaneously the associated tracks, for the first 30 degrees (approximately) of the rotation angle since either pair of magnetic heads commences the scan operation.

In the insertion mode in which the magnetic head pairs 112A, 110A and 112B, 110B are scanning helical tracks 20 as stated above, the signals read by the magnetic heads 112A and 112B are supplied to the playback amplifiers 154A and 154B, respectively. The pilot, audio, and video signals are delivered to the servo circuit 146, FM audio circuit 142, and video circuit 144, respectively.

On the other hand, the servo circuit 146 performs the ATF control with the pilot signals extracted by the magnetic head 112A or 112B.

The video signals to be inserted from the external video input 176 are outputted on the output 150 of the video circuit 144. The output signals are mixed by the signal composing circuit 140 with the audio signals supplied from the external input 172 to appear on the output 148 of the FM audio circuit 142, audio signals which are sensed from the corresponding track 20 on the video tape 10 from the playback amplifiers 154A and 154B through BPF 160, and the pilot signals which are also read from the associated tracks on the video tape 10 via the playback amplifiers 154A and 154B and the LPF 164 to appear on the output 152 of the servo circuit, the resultant composed signals being fed to the recording amplifier 136.

The obtained composite signals are supplied in parallel to the magnetic heads 110A and 110B through the switch SW2, which is connected to the terminal A at this moment, to be recorded in the video areas 28 of the associated helical tracks 20. Since the frequency modulated luminance signal thus functions as a high frequency bias, when the new signals are recorded over the previously recorded signals, the information of such signals previously recorded are erased, so that the new signals are recorded as valid information.

Since the optional PCM area 24 on the track 20 is not utilized in this embodiment, the same signals as those written in the video area 28 are recorded in this area 24, that is, the same data as that recorded on the preceding track is duplicated. If PCM signals are written in the PCM area 24, however, it is only necessary to provide a changeover circuit which alternately changes over control between the magnetic heads 110A and 110B with a short overlap period for the operations of these heads 110A and 110B each time the drum 108 completes a rotation of approximately 180 degrees.

When the content of the tape counter 188, which was set beforehand to 0 at the end of an insertion portion, becomes 0 again at the time t5 in FIG. 5, the mode control 126 releases the insertion mode in response to this condition to set the system to the stop mode, which completes the insertion editing operation.

In the insertion editing operation according to this embodiment, the new pilot signals to be recorded on the track 20 are created from the pilot signals previously recorded on the track 20. Specifically the previously recorded pilot signals are applied to the servo circuit 146, and pilot signals having the same frequency are supplied to the mixer 140, the resultant signals being recorded on that track via the recording amplifier 136. The following procedures may be adopted as an alternative operation. That is, during the playback operation up to the time t2 in FIG. 5, the pilot signal sensed on the track immediately before the pause mode is set is identified in frequency to be stored in memory. The stored frequency is subsequently used to determine the pilot frequency to be generated after the pause mode is released; thereafter, the pilot signal frequency is sequentially changed in response to the RF switching pulse.

As described hereinabove, in the insertion editing operation for a video tape on which the video signals are recorded in the same track as the audio signals according to the helical scanning system, the playback head for extracting the audio signals is positioned ahead of the record head in the running direction thereof, and the audio signals read by the playback head are re-recorded on the same track with other signals with a certain delay if necessary. Additionally, the system may be constructed by using a magnetic head dedicated to the audio and pilot signal reproduction, and a low-cost head is thus applicable. Furthermore, the insertion editing operation can be executed without causing the audible sound to be interrupted, and hence the atmosphere of a playback scene on which a signal has been inserted would not be disturbed.

While the present invention has been described with reference to the particular illustrative embodiment, it is not to be restricted by those embodiments but only by the appended claims. It is to be appreciated that those skilled in the art can change or modify the embodiments without departing from the scope and spirit of the present invention.

What is claimed is:

1. A video tape editing apparatus operable in an editing mode and a playback mode for performing an insertion editing operation in a system in which frequency-modulated audio signals are recorded in multiplex on a video track of a video tape in accordance with a helical scanning method, the frequency-modulated audio signals being lower in frequency than a minimum frequency of a luminance signal band of the video signals, comprising:

a rotating head assembly rotating at a predetermined speed;

first magnetic head means carried on said rotating head assembly for recording and sensing signals on and from the video track;

second magnetic head means carried on said head assembly at a position upstream from said first magnetic head means by a predetermined angular distance in a direction in which said rotating head assembly rotates;

said second magnetic head means having a head gap width such that said second magnetic head means is substantially sensitive to frequency bands lower than said minimum frequency;

recording circuit means for receiving signals and causing said first magnetic head means to record the received signals on the video track;

playback circuit means for reproducing signals sensed by either of said first and second magnetic head means from the video track;

a plurality of switch means for establishing selective circuit connection between said first and second magnetic head means and said recording and playback circuit means;

mode selector means for selecting either of the editing and playback modes; and mode control means responsive to said mode selector means for controlling said plurality of switch means to cause said plurality of switch means to couple said first magnetic head means to said playback circuit means and to decouple said second magnetic head means from said playback circuit means in said playback mode, and to cause said plurality of switch means to couple said first magnetic head means to said recording circuit means and to couple said second magnetic head means to said playback circuit means in said editing mode.

2. An apparatus in accordance with claim 1, further comprising mixer circuit means for receiving video signals from an external source and mixing the received video signals with the frequency-modulated audio signals sensed by said second magnetic head means;

said recording circuit means receiving, in the editing mode, the mixed signals from said mixer means to cause said first magnetic head means to record the mixed signals on the video track.

3. An apparatus in accordance with claim 1, further comprising mixer circuit means for receiving video signals from an external source and audio signals from an external source and mixing the received video signals with the frequency-modulated audio signals sensed by said second magnetic head means and the received audio signals;

said recording circuit means receiving, in the editing mode, the mixed signals from said mixer means to cause said first magnetic head means to record the mixed signals on the video track.

4. An apparatus in accordance with claim 1, wherein pilot signals are recorded in multiplex on the video track, the pilot signals being lower in frequency than said minimum frequency, further comprising:

mixer circuit means for receiving video signals from an external source and audio signals from an external source and mixing the received video signals with the pilot signals sensed by said second magnetic head means and the received audio signals;

said recording circuit means receiving, in the editing mode, the mixed signals from said mixer means to cause said first magnetic head means to record the mixed signals on the video track.

5. An apparatus in accordance with claim 4, further comprising:

tape feeding means for feeding the video tape via said rotating head assembly at a predetermined speed; and servo control means operative in response to the sensed pilot signals for servo controlling said tape feeding means so as to cause said second magnetic head means to track said video track.

6. An apparatus in accordance with claim 1, further comprising indicator means for indicating to said mode control means a position on the video tape at which an insertion editing operation is to be terminated;

said mode control means stopping the insertion editing operation at the position indicated by said indicator means.

* * * * *